United States Patent [19]
Nishi et al.

[11] Patent Number: 4,818,511
[45] Date of Patent: Apr. 4, 1989

[54] PROCESS AND APPARATUS FOR PRODUCING NON-OXIDE COMPOUNDS

[75] Inventors: Yoshitsuga Nishi; Kenji Kawasaki; Mutuo Hayashi; Chitake Yamagishi, all of Tokyo, Japan

[73] Assignee: Nihon Cement Co., Ltd., Tokyo, Japan

[21] Appl. No.: 76,222

[22] Filed: Jul. 22, 1987

[51] Int. Cl.$^4$ .................. C01B 21/068; C01B 21/064; B01J 8/28

[52] U.S. Cl. .................... 423/344; 423/290; 423/345; 423/412; 422/142; 422/145; 422/146; 422/233; 34/57 A

[58] Field of Search ........ 422/141, 145–147, 422/232, 233, 236, 239, 240, 142, 199, 200, 202; 423/290, 344, 345, 412; 34/57 A

[56] References Cited

U.S. PATENT DOCUMENTS

| | | | |
|---|---|---|---|
| 2,433,726 | 12/1947 | Angell | 422/142 |
| 2,596,611 | 5/1952 | Weidman et al. | 422/142 |
| 2,676,668 | 4/1954 | Lindsay | 422/141 |
| 3,232,706 | 2/1966 | Kuhn | 423/290 |
| 3,368,871 | 2/1968 | O'Connor et al. | 423/345 |
| 3,937,792 | 2/1976 | Lumby et al. | 423/344 |
| 4,529,575 | 7/1985 | Enomoto et al. | |
| 4,610,864 | 9/1986 | Kuramoto et al. | 423/344 |

FOREIGN PATENT DOCUMENTS

| | | | |
|---|---|---|---|
| 0605599 | 9/1960 | Canada | 423/412 |
| 54-33899 | 3/1979 | Japan. | |
| 54-42000 | 12/1979 | Japan. | |
| 58-20885 | 4/1983 | Japan. | |
| 0045912 | 3/1984 | Japan | 423/344 |
| 60-251108 | 12/1985 | Japan. | |
| 61-74635 | 4/1986 | Japan. | |
| 61-97110 | 5/1986 | Japan. | |
| 62-83307 | 4/1987 | Japan. | |
| 81/02292 | 8/1981 | PCT Int'l Appl. | 423/345 |

Primary Examiner—Michael S. Marcus
Assistant Examiner—Rebekah A. Griffith
Attorney, Agent, or Firm—Birch, Stewart, Kolasch & Birch

[57] ABSTRACT

A process for producing non-oxide compounds such as silicon nitride and silicon carbide by using a multi-stage apparatus constructed of a raw material drier section, a reactor section including a multiplicity of reaction vessels, and a non-oxidizing gas feeder section, is disclosed. The sections are arranged serially in the vertical direction. Raw materials are reacted with one another while fluidizing or bubbling by a hot non-oxidizing gas (argon or nitrogen) occurs in the raw material drier section and reaction vessels.

8 Claims, 1 Drawing Sheet

PROCESS AND APPARATUS FOR PRODUCING NON-OXIDE COMPOUNDS

FIELD OF THE INVENTION AND BACKGROUND ART DISCUSSION

The present invention relates to a process and apparatus for producing non-oxide compounds. More particularly, invention is concerned with a process and apparatus for continuously producing non-oxide ceramics such as silicon nitride, silicon carbide, boron nitride, aluminum nitride, and sialon.

In general, the production of the above-mentioned non-oxide compounds involves the reaction of raw materials at an elevated temperature of 1300–1800° C. in a non-oxidizing gas such as nitrogen. The following processes have been proposed for the production under such conditions.

(1) A process that employs a single-stage vertical furnace. According to this process, a vertical reaction chamber made of refractories is filled with raw materials and supplied with a non-oxidizing gas. While falling by gravity, the raw materials are heated by heaters attached to the outside of the reaction chamber. (Japanese Patent Laid-Open No. 33899/1979)

(2) A process that employs an externally heated rotary furnace of a dual cylinder structure made up of a carbon cylinder and a protective cylinder to prevent oxidation. A non-oxidizing gas is passed through the dual cylinder while it is externally heated by a fuel oil burner or the like. (Japanese Patent Laid-Open No. 74635/1986)

(3) A process that employs an internally heated rotary furnace of such a structure that a rod heater is arranged in a rotating carbon cylinder covered with an insulating material. In operation, a non-oxidizing gas is passed through the rotating carbon cylinder. (Japanese Patent Publication No. 42000/1979)

(4) A process for the production of silicon nitride that employs a single-stage vertical furnace made up of a carbon reaction vessel. At the top of the reaction vessel is a feed inlet and at the bottom is a porous plate through which a gas is introduced and on the outside is an induction heating coil. (Japanese Patent Laid-Open No. 251108/1985)

The above-mentioned conventional processes, however, have their respective disadvantages. According to process (1), a non-oxidizing gas is passed through a reaction chamber filled with raw materials. This prevents the gas from flowing uniformly through the raw materials, leaving unreacted oxides and forming undesirable intermediates. With this process, it is difficult to produce products of uniform quality.

According to processes (2) and (3), the reaction is performed while raw materials are being stirred. This permits the production of a non-oxide powder of uniform quality. However, when the powder bed is thicker than 50 mm, the gas does not diffuse into the raw materials completely and there is a strong possibility that the raw materials partly remain unreacted. Thus the powder bed is limited in thickness. An additional disadvantage is that these processes require a large-scale apparatus for mass production, which leads to high high investment and operating costs. Moreover, passing an excess of non-oxidizing gas makes these processes unsuitable for industrial production.

In process (4), raw materials are uniformly mixed with a non-oxidizing gas; however in order to fluidize the raw materials a large amount of non-oxidizing gas is required. The use of a large amount of gas causes a partial loss of SiO, an intermediate in the production of silicon nitride as shown in the following equations. This leads to a decreased yield.

$$SiO_2 + C \rightarrow SiO + CO \qquad (1)$$

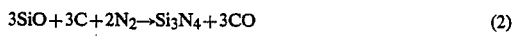
$$3SiO + 3C + 2N_2 \rightarrow Si_3N_4 + 3CO \qquad (2)$$

A common disadvantage of the above-mentioned conventional processes is that the reaction gas at a high temperature is discharged as such and consequently a large amount of heat energy is lost. In the case in which a carbon structure is used in the apparatus, the raw materials should be bone dry and an additional apparatus is required to dry the raw materials.

OBJECT AND SUMMARY OF THE INVENTION

The present invention was completed to eliminate the disadvantages of the conventional processes. Accordingly, it is an object of the present invention to provide a process for industrially producing non-oxide compounds of high quality at a low cost with a small amount of energy.

It is another object of the present invention to provide a process for producing non-oxide compounds with a multi-stage reaction apparatus made up of a reactor section, a raw material drier section arranged above the reactor section, and a non-oxidizing gas feeder section arranged under the reactor section, the reactor section including a plurality of cylindrical reaction vessels vertically placed on top of each other, each of the reaction vessels being provided with a plate having a plurality of gas inlets and a raw material discharger to open and close the gas inlets at its bottom and also with a heater on its inside or outside, the raw material drier section including a raw material drier provided with a plate having a plurality of gas inlets and raw material discharger to open and close the gas inlets at its bottom and also with a raw material feeder at its top, the non-oxidizing gas feeder section being provided with a cooling chamber, product discharge chute, gas preheating chamber, and gas feeding pipe and having a heater on its outside. The process involves raw materials to the raw material drier section from the raw material feeder, drying the raw materials, introducing the dried raw materials into the reaction vessel of the reactor section, subsequently introducing the raw materials into the lower reaction vessel by operating the raw material discharger, introducing a non-oxidizing gas through the non-oxidizing gas feeder simultaneously with the procedure, thereby fluidizing or bubbling the raw materials in the raw material drier section and each of the reaction vessels, contacting the raw materials with the non-oxidizing gas at a high temperature, drying the raw materials and completing the reaction, and introducing the reaction product into the cooling chamber for cooling.

The apparatus used for the process of the invention includes reaction vessels which are hollow cylinders made of carbon, silicon carbide, or silicon nitride. Each of them is provided with a heater made of carbon or silicon carbide.

The reaction vessel is heated to 1350–1800° C. by a heater provided externally or internally. The reaction vessel is supplied with a reaction gas through the bottom thereof. The reaction gas is a non-oxidizing gas such as nitrogen and argon. The flow rate of the non-oxidizing gas in the reaction vessel should preferably be higher than 0.1 cm/sec and lower than 100 cm/sec. The raw materials should preferably have an average particle diameter of 10 μm to 10 mm.

DETAILED DESCRIPTION OF THE PREFERRED EMBODIMENTS

Figure 1:
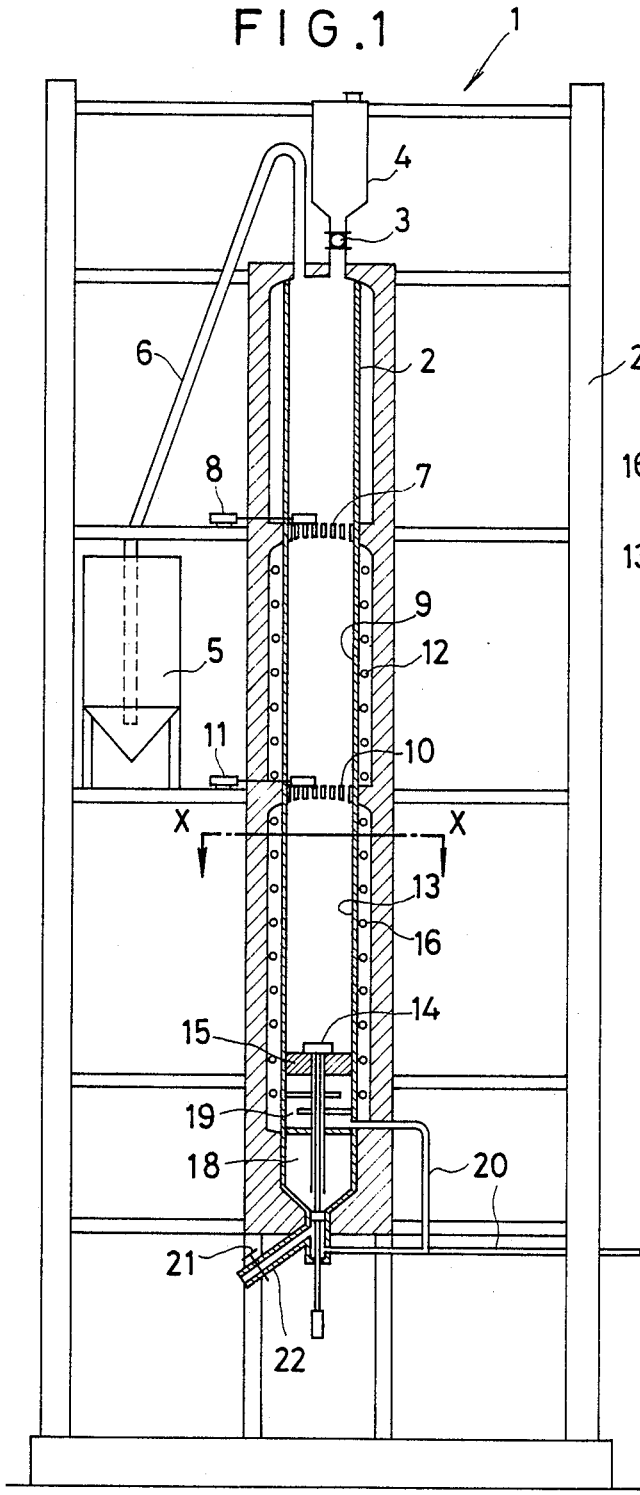
FIG. 1 is a diagrammatic view of the apparatus used to produce a non-oxide compound according to the process of the invention.

The apparatus 1 of the present invention is a multi-stage apparatus made up of a raw material drier section, a reactor section, and a non-oxidizing gas feeder section, as shown in FIG. 1. The top (first) stage is the raw material drier 2 which is a stainless steel container. It is provided with the rotary feeder 3, the raw material feeder 4, the exhaust pipe 6 through which to introduce exhaust gas to the bag filter 5, the gas distributor 7 having a multiplicity of gas inlets, and the raw material discharger 8.

The reactor section is made up of a plurality of reaction vessels 9 and 13 serially arranged in the vertical direction. The reaction vessels are designated as the second stage, the third stage, and so on (the first stage is the raw material drier section 2).

The reaction vessel 9 in the second stage is provided at its bottom with the gas distributor 10, which is a plate having a plurality of gas inlets, and the raw material discharger 11. It is also provided with the heater 12 on its outside.

The reaction vessel 13 in the third stage is provided at its bottom with the valve-operated product discharger 14 and the gas distributor 15 made of porous carbon. It is also provided with the heater 16 on its outside.

The apparatus shown in FIG. 1 shows the reaction vessels 9 and 13 placed on top of the other. However, the present invention is not limited to this arrangement. It is within the scope of the invention to increase or decrease the number of the reaction vessels according to how difficult reaction of raw materials is to carry out.

The fourth stage is the non-oxidizing gas feeder which is made up of the gas preheating chamber 19 (upper half) provided with the gas feeding pipe 20 and the cooling chamber 18 (lower half) provided with the valve-operated product discharging chute 22.

The raw material drier section, the reactor section (reaction vessels), and the non-oxidizing gas feeder section are connected with tight seal to prevent gas leakage.

Figure 2:
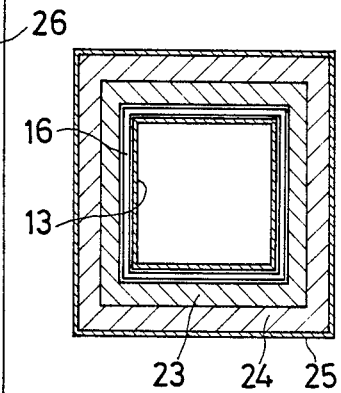
FIG. 2 is an enlarged sectional view taken in the direction of the arrows along the line X—X.

FIG. 2 is an enlarged sectional view showing the refractory walls surrounding the reaction vessel. For heat insulation of the entire reaction vessel, the heater 16 is surrounded by the carbon felt 23, which is in turn surrounded by the bricks 24. The bricks 24 are covered with the metal casing 25 to prevent gas leakage.

The entire unit of the apparatus 1 is fixed to the frame stand 26.

Raw materials are introduced into the raw material drier section 2 (in the first stage) quantitatively at certain time intervals from the raw material feeder 4 by the rotary feeder 3. In the raw material drier section 2, the raw materials come into contact with a hot gas introduced through the gas distributor 7 from the reaction vessel 9 in the second stage. Thus the raw materials are dried through fluidizing or bubbling until they become bone dry.

In this way the reaction vessel is protected from being deteriorated by moisture evaporating from the raw materials. (A carbon reaction vessel is oxidized by steam.)

The bone dry raw materials are subsequently introduced into the reaction vessel 9 (the second stage) as the raw material discharger 8 is operated. In the reaction vessel 9, the raw materials are heated by the heater 12 and simultaneously fluidized or bubbled by the non-oxidizing gas introduced through the gas distributor 10. In this period, the reaction partially proceeds and the raw materials are mixed uniformly. The raw materials are subsequently introduced into the reaction vessel 13 (the third stage) as the raw material discharger 11 is operated. In the reaction vessel 13, the raw materials are fluidized or bubbled by the non-oxidizing gas at a high temperature (1350–1800° C.) introduced from the gas distributor 15. In this period, the reaction is completed and the desired product (non-oxide compound) is formed.

The product is discharged to the cooling chamber 18 as the rod for product discharger 14 is moved up and down. In the cooling chamber 18, the product is cooled by the gas introduced through the gas feeding pipe 20. The cooled product is discharged from the chute 22 as the valve 21 is operated at certain time intervals.

The non-oxidizing gas introduced through the gas feeding pipe 20 is preheated in the preheating chamber 19 to a temperature high enough for the reaction. The source of heat for preheating is supplied by the product and heater. The preheated gas is introduced into the reaction vessel 13 (the third stage) through the gas distributor 15.

The exhaust gas is introduced into the bag filter 5 through the exhaust pipe 6, and it is discharged after dust removal.

The above-mentioned procedures are repeated to produce the non-oxide compound.

EXAMPLES

The reaction in the following examples was carried out using the apparatus as shown in FIG. 1. The raw material drier section measures 600 mm by 600 mm and 2000 mm long. Each of the reaction vessels (the second and third stages) measures 600 mm by 600 mm and 2000 mm long. The gas feeder section (the fourth stage) measures 600 mm by 600 mm and 1300 mm long.

The raw materials were silica, carbon, and urea resin powder mixed at a ratio of 1.0:0.35:1.0 by weight. The raw materials were fed to the above-mentioned apparatus and reacted with one another in nitrogen as the non-oxidizing gas. The reaction product was decarbonized by oxidation with air in the usual way. The thus obtained non-oxide compound was identified by X-ray diffractometry.

The following are the reaction conditions and the results of identification.

Example 1

Reaction conditions:
    Feed rate of raw materials (2.2% moisture content): 20 kg/hour
    Reaction temperature: 1480° C.
    Feed rate of nitrogen gas: 19 Nm$^3$/hour
    Frequency of discharging the raw materials in each stage: 1 cycle/2.5 hours Electric power: 90 kWh
Reaction product:
 Results of X-ray diffractometry: α-Si$_3$N$_4$ only
 Amount produced: 6.4 kg/hour

Example 2

Reaction conditions:
 Feed rate of raw materials (2.2% moisture content): 20 kg/hour
 Reaction temperature: 1480° C.
 Feed rate of nitrogen gas: 15 Nm$^3$/hour
 Electric power: 82 kWh
Reaction product:
 Results of X-ray diffractometry: α-Si$_3$N$_4$ only
 Amount produced: 6.4 kg/hour
The yield of α-Si$_3$N$_4$ was 98% in both of Examples 1 and 2.

Comparative Example 1

The reaction was carried out using the apparatus used in Example 1, with the raw material drier section (the first stage) and the reaction vessel (the second stage) removed and the raw material feeder 4 connected directly to the reactor 13 (the third stage). The same materials as used in Example 1 and 2 were used.
Reaction conditions:
 Feed rate of raw materials (2.2% moisture content): 20 kg/hour
 Reaction temperature: 1480° C.
 Feed rate of nitrogen gas: 100 Nm$^3$/hour
 Electric power: 135 kWh
Reaction product:
 Results of X-ray diffractometry: α-Si$_3$N$_4$ only
 Amount produced: 5.1 kg/hour
The power consumption was higher than in Examples 1 and 2 and yet the yield of α-Si$_3$N$_4$ was about 80%.

Comparative Example 2

The procedure of Comparative Example 1 was repeated except that the feed rate of nitrogen gas was changed to 20 Nm$^3$/hour. The power consumption was 130 kWh.
Reaction product:
 Results of X-ray diffractometry: α-Si$_3$N$_4$, SiC, SiO$_2$.
 Amount produced: 5 kg/hour
It is noted that when the amount of nitrogen is reduced, the reaction product is a mixture of α-Si$_3$N$_4$, SiC, and SiO$_2$.

Comparative Example 3

The same raw materials as used in Example 1 were reacted with one another in nitrogen by using an internally heated horizontal kiln measuring 600 mm in inside diameter and 3000 mm long.
Reaction conditions:
 Feed rate of raw materials: 7 kg/hour
 Reaction temperature: 1480° C.
 Feed rate of nitrogen gas: 110 Nm$^3$/hour
 Electric power: 130 kWh
Reaction product:
 Results of X-ray diffractometry: α-Si$_3$N$_4$ only
 Amount produced: 1.8 kg/hour
It is noted that the power consumption was high and yet the yield of α-Si$_3$N$_4$ was as low as 78%.

Comparative Example 4

The procedure of Comparative Example 3 was repeated except that the feed rate of nitrogen was changed to 15 Nm$^3$/hour. The power consumption was 125 kWh.
Reaction product:
 Results of X-ray diffractometry: α-Si$_3$N$_4$, SiC, Si$_2$ON$_2$
 Amount produced: 1.85 kg/hour
It is noted that when the feed rate of nitrogen is low, the product is a mixture of α-Si$_3$N$_4$, SiC, and Si$_2$ON$_2$ (intermediate).

As mentioned above, the process of the invention for producing non-oxide compounds has the following effects.

(1) Since the apparatus of the invention is made up of the raw material drier section and reactor section which are vertically arranged, the raw materials introduced into the raw material drier section are dried by a hot non-oxidizing gas flowing upward from the reactor section. Thus the process and apparatus of the invention obviate the need for drying raw materials by using a separate unit.

(2) Because the apparatus of the invention has the reaction vessels in multiple stages, the gas once used for reaction is introduced into the upper reaction vessel for reuse. Therefore, the consumption of the non-oxidizing gas is greatly reduced in the process of the invention as compared with the conventional rotary kiln process or single-stage fluidized bed (vertical furnace) process.

(3) In the production of silicon nitride, yields are rather low when the conventional rotary kiln or single-stage fluidized bed is used. This is because SiO as an intermediate is partly discharged from the system together with the non-oxidizing gas. (It is considered that silicon nitride is produced according to the above-mentioned equations (1) and (2).) By contrast, the yield of silicon nitride is remarkably high when the multi-stage apparatus of the invention is used. This is because SiO formed in the first reaction vessel is collected by the raw materials in the second reaction vessel placed above the first reaction vessel. The thus collected SiO is used again as a raw material.

(4) The apparatus of the invention turns out more product per hour than the conventional vertical furnace, by virtue of its ability to continuously move the raw materials downward and to continuously perform the reaction.

(5) Since the raw materials and the non-oxidizing gas are uniformly mixed during reaction, a uniform product containing no unreacted materials and intermediate products is obtained.

(6) The hot non-oxidizing gas used for the reaction is used again for reaction in the upper reaction vessel and also for drying raw materials. This contributes to the saving of heat energy.

What is claimed is:

1. A process for producing non-oxide compounds which comprises, providing a multi-stage reaction apparatus made up of a reactor section, a raw material drier section arranged above the reactor section, and a non-oxidizing gas feeder section arranged under the reactor section, said reactor section including a plurality of cylindrical reaction vessels vertically placed on top of the other, each of said reaction vessels being provided with a plate having a plurality of gas inlets and a raw material discharger to open and close said gas inlets at its bottom and also with a heater on its inside or outside, said raw material drier section including a raw material drier provided with a plate having a plurality of gas inlets and a raw material discharger to open and close said gas inlets at its bottom and also with a raw material feeder at its top, said non-oxidizing gas feeder section being provided with a cooling chamber, product discharge chute, gas preheating chamber, and gas feeding pipe and having a heater on its outside, feeding raw materials to the raw material drier section from the raw material feeder, drying the raw materials, introducing the dried raw materials into the reaction vessel of the reactor section, subsequently introducing the raw materials into the lower reaction vessel by operating the raw material discharger, introducing a non-oxidizing gas through the non-oxidizing gas feeder simultaneously with said procedure, thereby fluidizing or bubbling the raw materials in said raw material drier section and each of said reaction vessels, contacting the raw materials with the non-oxidizing gas at a high temperature, drying the raw materials and completing the reaction, and introducing the reaction product into the cooling chamber for cooling.

2. A process as claimed in claim 1 wherein the non-oxide compound is silicon nitride, silicon carbide, boron nitride, aluminum nitride, or sialon.

3. A process as claimed in claim 1 wherein the non-oxidizing gas is nitrogen or argon.

4. A process as claimed in claim 1 wherein the raw material introduced into the raw material drier section is one which has a particle diameter of 10 μm to 10 mm.

5. A process as claimed in claim 1 wherein the non-oxidizing gas is introduced into the reaction vessel at a flow rate of 0.1 to 100 cm/sec.

6. A multi-stage reaction apparatus for producing non-oxide compounds which comprises a reactor section, a raw material drier section arranged above the reactor section and a non-oxidizing gas feeder section arranged under the reactor section, said reactor section including a plurality of cylindrical reaction vessels vertically placed on top of the other, each of said reaction vessels being provided with a plate having a plurality of gas inlets and a raw material discharger to open and close said gas inlets at its bottom and also with a heater on its inside or outside, said raw material drier section including a raw material drier provided with a plate having a plurality of gas inlets and a raw material discharger to open and close said gas inlets at its bottom and also with a raw material feeder at its top, said non-oxidizing gas feeder section being provided with a cooling chamber, product discharge chute, gas preheating chamber, and gas feeding pipe and having a heater on its outside.

7. A multi-stage reaction apparatus as claimed in claim 6 wherein said reactor section includes two reactors.

8. A multi-stage reaction apparatus as claimed in claim 6 wherein said cylindrical reaction vessels are made of carbon, silicon carbide, or silicon nitride.

* * * * *